Nov. 10, 1953 R. W. JOHNSON 2,658,324
SUSPENSION FOR SIDE DELIVERY RAKES
Filed Aug. 2, 1949 4 Sheets-Sheet 1

INVENTOR
Roy W. Johnson
BY
ATTORNEYS

Nov. 10, 1953    R. W. JOHNSON    2,658,324
SUSPENSION FOR SIDE DELIVERY RAKES
Filed Aug. 2, 1949    4 Sheets-Sheet 2

INVENTOR
Roy W. Johnson
BY
ATTORNEYS

Nov. 10, 1953 R. W. JOHNSON 2,658,324
SUSPENSION FOR SIDE DELIVERY RAKES
Filed Aug. 2, 1949 4 Sheets-Sheet 4
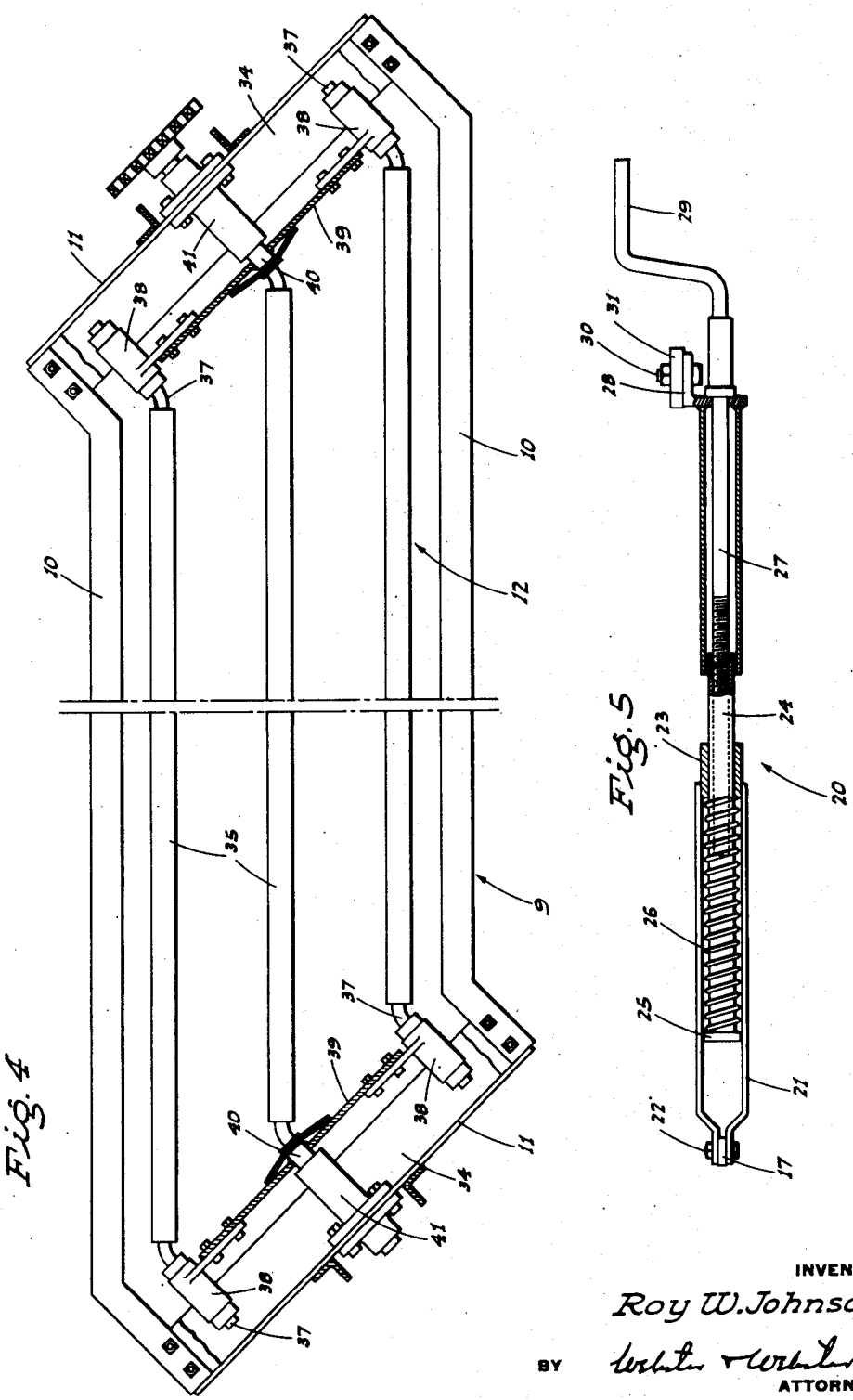
INVENTOR
Roy W. Johnson
BY
ATTORNEYS Patented Nov. 10, 1953

2,658,324

UNITED STATES PATENT OFFICE 2,658,324

SUSPENSION FOR SIDE DELIVERY RAKES

Roy W. Johnson, Woodland, Calif., assignor, by mesne assignments, to Estand, Inc., San Francisco, Calif., a corporation of Nevada Application August 2, 1949, Serial No. 108,092

8 Claims. (Cl. 56—377)

1

This invention relates in general to hay rakes; one object of the invention being to provide an improved side delivery hay rake of rotary or reel type.

Another object of the invention is to provide a side delivery rake wherein the rake assembly is mounted or suspended in floating relation to the main frame so that such rake assembly may follow ground contour as is desirable; there being novel control units operative to vertically adjust the rake assembly without interfering with such floating motion thereof.

An additional object of the invention is to provide a side delivery rake which includes a longitudinally arched main frame from which the rake assembly is suspended, diagonally of the direction of travel, in said floatable, independently vertically adjustable relation.

A further object of the invention is to embody a ground drive for the reel which is included in the rake assembly; such ground drive including a novel universal drive mechanism for the reel arranged to permit of said floating or vertical adjustment of the latter.

Another object of the invention is to provide a side delivery rake wherein the rake assembly includes a reel of simplified but sturdy and effective construction; such reel being operative to maintain the teeth substantially vertical at all times, and acting smoothly to sweep the hay cleanly and rapidly toward the discharge end of the reel with a minimum of entanglement, leaf damage, or shattering.

A separate object of the invention is to provide a side delivery rake which includes a novel lift mechanism operative to automatically raise the rake assembly relative to the main frame when the latter is lifted at the front by the power lift of the tractor to which the rake is coupled. In this manner a double lift of the rake assembly is attained to assure of adequate clearance thereof above the ground when in raised position.

It is also an object of the invention to provide a side delivery rake designed for ease and economy of manufacture; the rake being rugged and reliable, and requiring a minimum of maintenance or repair.

A still further object of the invention is to provide a practical and reliable side delivery rake, and one which will be exceedingly effective for the purpose for which it is designed.

These objects are accomplished by means of such structure and relative arrangement of parts as will fully appear by a perusal of the following specification and claims.

2

In the drawings:

Fig. 4 is an enlarged plan view of the reel and its frame detached, the raking teeth being omitted from the reel for clarity.

Fig. 5 is an enlarged plan view of one of the rake assembly control units.

Figure 1:
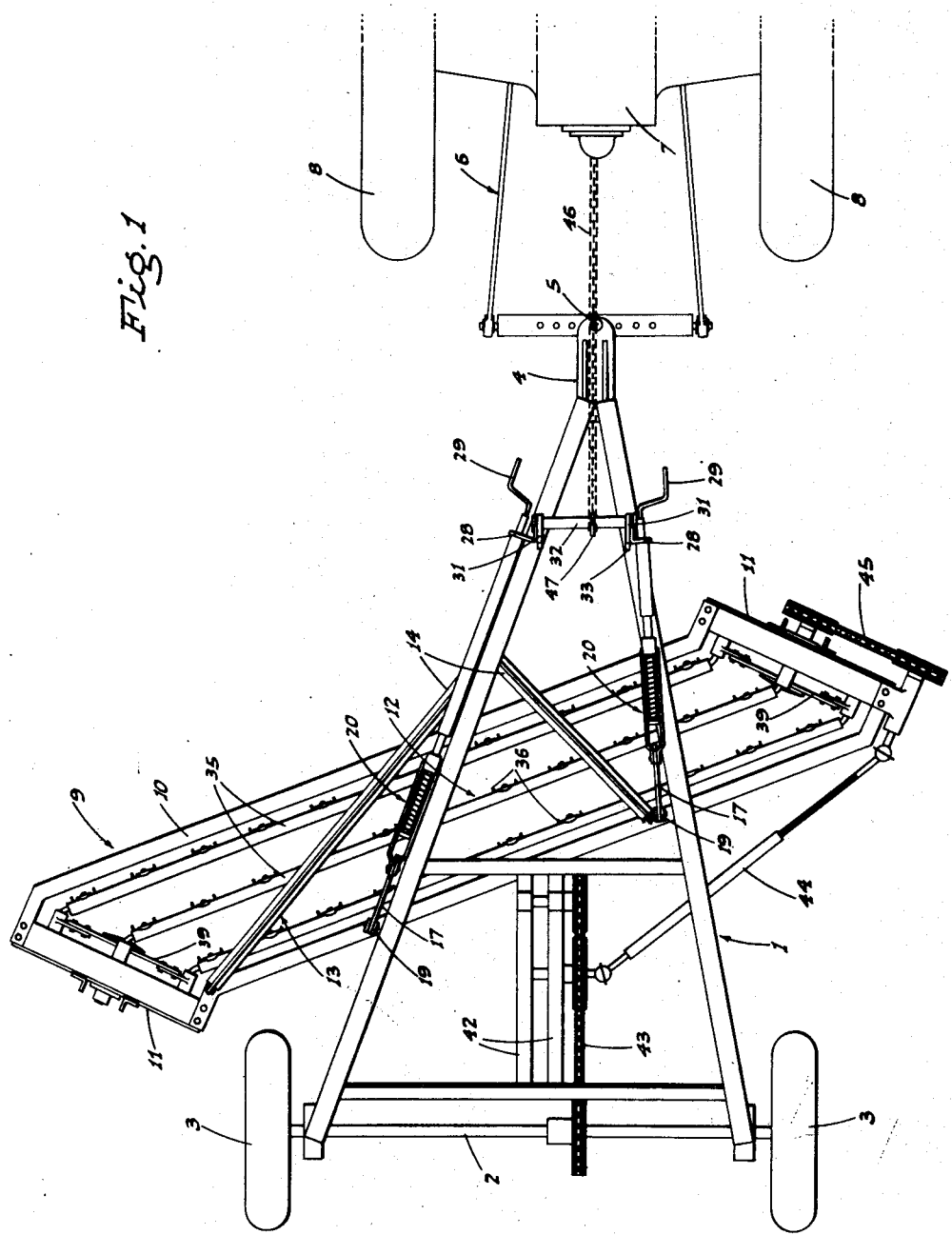
Fig. 1 is a plan view of the implement.
Figure 2:
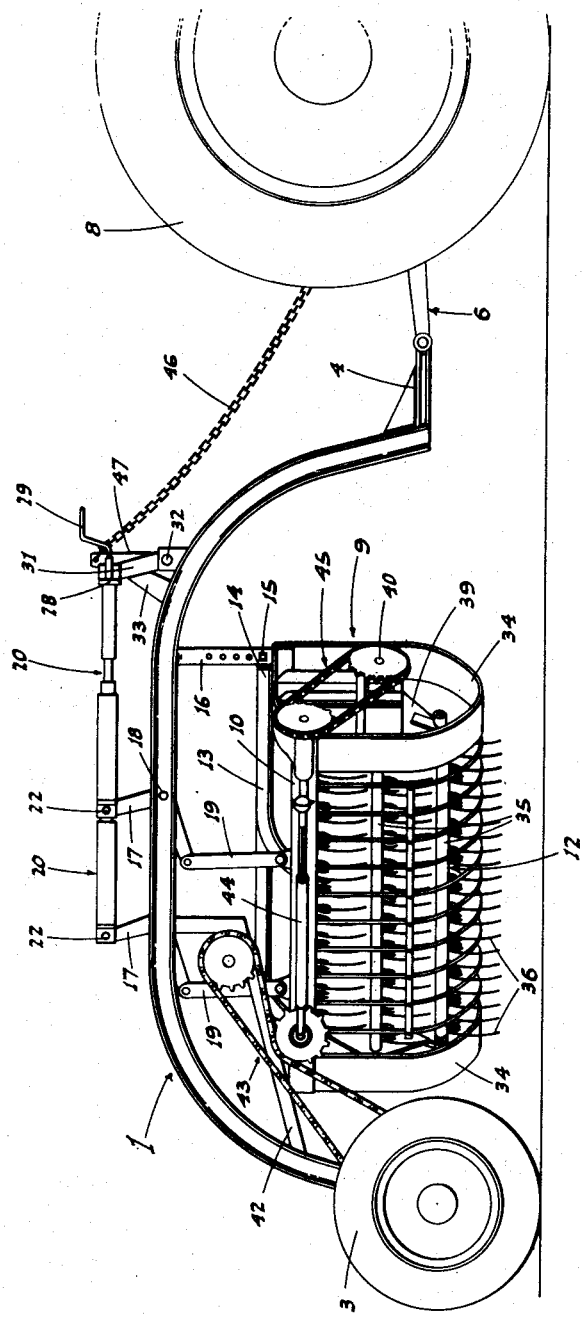
Fig. 2 is a side elevation of the implement.
Figure 3:
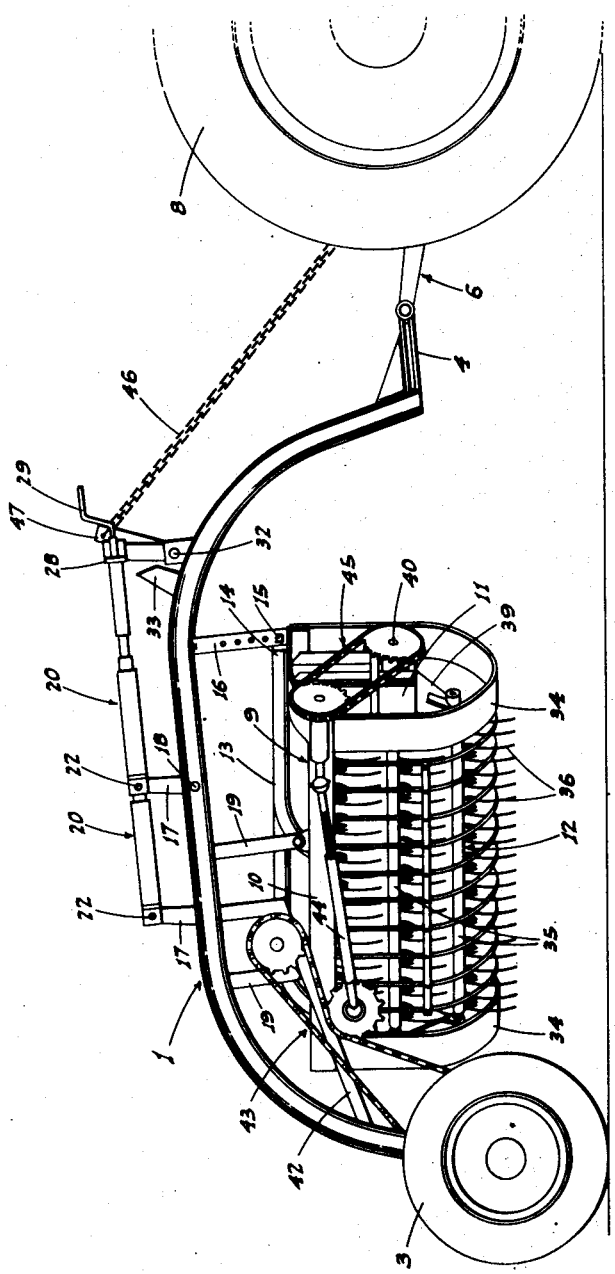
Fig. 3 is a similar view, but shows the implement as being raised.

Referring now more particularly to the characters of reference on the drawings, the improved side delivery rake comprises a longitudinally arched main frame, indicated generally at 1, which main frame is of generally A-shape in plan with the apex foremost.

At its rear end the frame 1 is fitted with an axle 2 supported, at opposite ends, by pneumatic tire wheels 3; one of said wheels being keyed to the axle 2 whereby to rotate it for the purpose hereinafter described.

At its forward end the main frame 1 is formed with a hitch 4 adapted to pivotally connect, as at 5, to the power lift unit 6 on the rear of a tractor 7; the rear wheels of said tractor being indicated at 8.

By raising or lowering the power lift unit 6, the main frame 1 is correspondingly raised or lowered at the front and about the axle 2.

A rake assembly, indicated generally at 9, is disposed beneath the longitudinally arched main frame 1 intermediate its ends and ahead of the rear wheels 3, whereby said wheels always travel on ground already raked; such rake assembly being disposed diagonally with respect to the direction of travel.

The diagonally disposed rake assembly comprises a substantially horizontal, transversely elongated rake frame 10 including frame ends 11, and between which frame ends a hay raking reel is journaled, said reel being indicated generally at 12, and hereinafter described in detail.

The diagonally disposed rake assembly 9 is floatably and vertically adjustably suspended from the arched main frame 1 as follows:

On top thereof and intermediate its ends the rake frame 10 has a forwardly projecting V-brace 13 affixed thereto; the front end portion of said V-brace providing an attachment bracket 14 which is pivotally connected in loose-play relation, as at 15, to a rigid suspension arm 16 fixed on and depending from one side of the main frame 1 ahead of the main portion of the rake assembly 9. The pivot 15 is vertically adjustable on the suspension arm 16 for setting as working conditions may require.

With the above arrangement the rake assembly 9 is movable up or down about the pivot 15 as an axis.

Above the rear portion of the rake frame 10 the main frame 1 is fitted, on opposite sides thereof, with a bellcrank lever 17 pivoted, as at 18, and including a rearwardly projecting leg and an upwardly projecting leg, as shown.

The lower leg of each bellcrank lever 17 is connected by a pivoted link 19 with the rear of the rake frame 10, while the upstanding leg of each bellcrank lever 17 is pivotally connected to the rear end of a longitudinal, forwardly extending rake assembly control unit, indicated generally at 20; each such control unit being spring balanced and structurally arranged as follows:

Each rake assembly control unit 20 comprises a forwardly elongated connection yoke 21 which is pivoted at its rear end to the upstanding leg of the corresponding lever 17, as at 22. At its forward end the connection yoke 21 includes a fixed guide collar 23 through which an elongated sleeve 24 slidably extends. There is a head 25 on the rear end of the sleeve 24, and a compression spring 26 surrounds the sleeve 24 between the collar 23 and head 25.

A screw 27 is adjustably threaded into the sleeve 24 from the forward end of the latter; such screw being rotatable but longitudinally immovably mounted in a swivel bracket 28. Ahead of the bracket 28 the screw 27 includes a hand crank 29.

The swivel bracket 28 is pivoted, as at 30, to the upper end of an upstanding radial lever arm 31 on a cross shaft 32 journaled on the main frame 1; such cross shaft 32 being common to both of the lever arms 31. Each lever arm 31 normally lies forwardly against a stop 33.

By manipulation of the hand cranks 29, the rake assembly control units 20 may be adjusted in their effective length whereby the bellcrank levers 17 and links 19 raise or lower the rake assembly 9 with respect to the ground. However, by virtue of the spring arrangement in such control units, the rake assembly 9 is capable of substantial up and down floating motion in any position of vertical adjustment thereof; i. e. irrespective of the screw setting of said control units. This is an important feature, as it permits the rake assembly to conform to ground contour as the implement advances, and additionally to ride over any obstructions which may be met; the rake assembly including U-shaped guard shoes 34 at opposite ends thereof to aid in this connection.

The reel 12 is of the following novel construction:

Said reel 12 comprises a plurality of equally circumferentially spaced tooth mounting rods 35, each carrying a row of spaced depending rake teeth 36 of spring type.

The tooth mounting rods 35 extend parallel to each other and to the longitudinal axis of the diagonal rake assembly 9, and such rods are each formed, at the ends, with opposed 45° cranks 37.

The opposed cranks 37 are each carried in a bearing 38 and the bearings corresponding to each end of the reel are fixed to an end plate 39 of the reel; said end plates 39 being disposed at right angles to the axis of the bearings 38.

Centrally thereof each end plate 39 includes an outwardly projecting axial spindle 40 journaled in a bearing 41 supported by the corresponding frame end 11 of the rake frame 10; said frame ends 11 being angled, as shown, to parallel the end plates 39.

With the above described reel structure no center shaft is required, which minimizes entangling of the hay when the implement is in use. Additionally, by forming the reel with tooth mounting rods 35 having exposed 45° cranks 37 journaled in connection with the end plates 39, said rods 35 always maintain the same relative position as the reel rotates, and thus the rake teeth 36 remain dependent at all times in the rotary path thereof, which is very desirable toward effective raking.

The reel 12 is driven from the ground, and at a speed proportionate to that of the implement, as follows:

A sub-frame 42 is formed centrally in the rear portion of the main frame 1, and an endless chain and sprocket unit 43 extends between the axle 2 and said sub-frame 42, actuating a splined, universal drive shaft 44 which leads laterally to one end of the rake assembly 9 and there drives an endless chain and sprocket unit 45 coupled to the adjacent reel spindle 40. With advance of the implement, with resultant ground drive of the axle 2 from one of the rear wheels 3, such drive is effectively imparted through the above mechanism to the reel 13, rotating it at a speed proportionate to that of the implement; the reel turning forwardly at the bottom, whereby the rows of dependent rake teeth 36 successively cooperate with the hay, sweeping it forwardly and laterally with a smooth easy action until it discharges from the trailing end of the rake assembly 9.

For adjustment of the normal working position of the diagonal rake assembly 9 the hand cranks 29 are actuated to alter the effective length of the rake assembly control units 20, as previously described.

When it is desired to lift the rake assembly 9 to a relatively high position to clear a ridge, levee, or other obstruction, or for transport, the power lift unit 6 of the tractor 7 is raised. At the same time the rake assembly 9 is swung upwardly at the rear end about the pivot 15 as an axis; such upward swinging of the rake assembly 9 being accomplished as follows:

As the power lift unit 6 raises, a normally slack pull chain 46, which is connected between the tractor chassis at the rear and a central upstanding radial lever arm 47 on the cross shaft 32, comes into play; i. e. becomes taut and pulls said lever arm 47 in a forward direction. When this occurs the cross shaft 32 is rotated in a direction to swing the radial lever arms 31 forwardly away from the stops 33, causing the rake assembly control units 20 to swing the bellcrank levers 17 in a direction to impose a lift on the links 19. When this occurs the rake assembly 9 is swung upwardly at the rear.

It will therefore be recognized that when the power lift unit 6 is employed to lift the main frame at the front end, an automatic lifting of the rake assembly 9 at the rear relative to said main frame takes place. This is in the nature of a compound lift, which assures that said rake assembly 9 is raised high enough to clear the obstacle or for convenient transport from place to place.

The depending rake teeth 36 are each preferably of dual tooth type, having spring coils formed therein; the teeth and coils being shaped so that the axis of the latter lies at substantially right angles to the direction of travel of the implement.

By reason of the three-point suspension of the rake assembly 9; i. e. from the suspension arm 16 at the front and from the transversely spaced links 19 at the rear, the rake assembly 9 can be adjusted or leveled by the simple manipulation of one or both of the control units 20.

With the above described side delivery rake, hay raking can be accomplished smoothly, rapidly, and with a minimum of leaf damage or shattering of the hay; the raked hay rolling freely ahead of the reel 12 and delivering continuously from the trailing end of the rake assembly 9.

As the implement is of relatively simple but sturdy construction, it requires a minimum of maintenance and repair; the floatability of the reel 12 assuring against its damage as it traverses the ground in following relation to the contour thereof. This also minimizes tooth breakage.

The implement provides a very practical and reliable tractor-drawn side delivery rake which is easy to use and adjust, and which produces a most effective raking action.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A side delivery rake comprising a main frame extending in the direction of travel, said main frame being wheel-supported at the rear and adapted to connect at the front to a tractor, a rake assembly extending transversely below the main frame, the rake assembly including a reel, means to drive the reel, means pivotally suspending the rake assembly at the front and intermediate its ends from the main frame for up and down swinging and transverse leveling motion, a pair of transversely spaced bellcrank levers pivoted on the frame above the rake assembly, transversely spaced lift links pivotally connected between the rake assembly at the rear and one leg of the corresponding bellcrank lever, and an adjustable length spring balanced control unit connected between the other leg of each bellcrank lever and a longitudinally spaced point on the main frame; the frame being adapted to connect at the front to a power lift unit at the rear of a tractor, and means adapted to connect between the tractor and said control units operative to simultaneously shift the same in a rake assembly raising direction upon lift of the frame at the front by said power lift unit.

2. A side delivery rake comprising a main frame extending in the direction of travel, said main frame being wheel-supported at the rear and adapted to connect at the front to a tractor, a rake assembly extending transversely below the main frame, the rake assembly including a reel, means to drive the reel, means pivotally suspending the rake assembly at the front and intermediate its ends from the main frame for up and down swinging and transverse leveling motion, a pair of transversely spaced bellcrank levers pivoted on the frame above the rake assembly, transversely spaced lift links pivotally connected between the rake assembly at the rear and one leg of the corresponding bellcrank lever, and an adjustable length spring balanced control unit connected between the other leg of each bellcrank lever and a longitudinally spaced point on the main frame; the control units extending longitudinally forward from the bellcrank levers, a cross shaft on the main frame adjacent the forward ends of said control units, radial lever arms on the cross shaft pivotally connected to said forward ends of the control units, a separate radial lever arm upstanding from the cross shaft, and a flexible connection leading forwardly and downwardly from said separate radial lever arm, the frame being adapted to connect at the front to a power lift unit on the tractor and the flexible connection being adapted to anchor to a fixed point on the tractor.

3. A side delivery hay rake comprising a longitudinally arched main frame of generally A-shape in plan with the apex forward, a rake assembly extending through the arch of the main frame diagonal to the direction of travel, means vertically adjustably and independently floatably suspending the rake assembly from the main frame, the latter being adapted to couple at the front to a tractor, and transversely spaced wheels supporting the frame at the rear; said suspension means including a pivotal connection between the front of the rake assembly and main frame, transversely spaced lift linkages pivotally connected between the rake assembly at the rear and the main frame, each linkage including a bellcrank lever having an upstanding leg, an adjustable length control unit connected with each such leg and extending forward therefrom, a cross shaft on the main frame adjacent the forward ends of the control units, radial lever arms on the cross shaft connected to said forward ends of the control units, stop means to limit rearward swinging of the radial lever arms, the main frame being adapted to connect to a power lift unit on the tractor, and means to rotate the cross shaft in a direction to swing the radial lever arms forward; said last named means being actuated in response to lifting of the main frame at the front by said power lift unit.

4. A side delivery rake comprising a main arched frame, ground wheels supporting the rear end of the main frame, means at the front end of the frame for connecting such end in draft relation with a tractor, a separate rigid elongated rectangular rake frame disposed below the main frame diagonally of the line of travel of the latter, a rake supported in said rake frame, and means mounting the rake frame in the main frame comprising a suspension arm fixed to and depending from the main frame forwardly of the rake frame at a point intermediate the sides of said rake frame, brace elements rigid with the rake frame and projecting forwardly therefrom to said suspension arm, loose play means pivoting the brace elements to the suspension arm at the lower end of the latter, and transversely spaced individually yieldable suspension units between the main frame and the rake frame adjacent the rear edge thereof.

5. A rake as in claim 4 in which each suspension unit includes a bell crank pivoted on the main frame, a spring pulled member mounted on the main frame and pivotally connected with one end of the bell crank, and a link pivotally connecting the other end of the bell crank and the rake frame adjacent its rear edge.

6. A rake as in claim 5 including means mounted on the main frame and connected with the spring pulled member and being operative to adjust the effective load of such member on the bell crank.

7. A side delivery rake comprising a main arched frame, ground wheels supporting the main frame at the rear, means at the front end of the frame for connecting such end in draft relation with a power lift mechanism of a tractor, a separate rigid rectangular rake frame disposed beneath the main frame diagonally of the line of travel of said main frame, a rake element carried in said rake frame, a suspension arm fixed to the main frame and depending therefrom forwardly of the rake frame, a loose play connection means pivotally connecting the rake frame to said arm for up and down swinging movement of the rake frame relative to the main frame, vertical links pivoted on the rake frame adjacent the rear edge of the latter, said links being spaced apart longitudinally of the rake frame, and separate means on the main frame and pivotally connected with each of said links and being separately operative to raise or lower said links.

8. A side delivery rake comprising a main arched frame, ground wheels supporting the main frame at the rear, means at the front end of the frame for connecting such end in draft relation with a power lift mechanism of a tractor, a separate rigid rectangular rake frame disposed beneath the main frame diagonally of the line of travel of said main frame, a rake element carried in said rake frame, means forming a single loose-play pivotal connection between the main and rake frames at the forward end and intermediate the sides of the rake frame, transversely spaced suspension units between the main frame and rake frame at spaced points on the back of the latter, means to individually adjust said units to raise or lower the rake frame at said points, and means between the tractor and said suspension units and responsive to the lifting of the front end of the main frame by the lift mechanism of the tractor to effect adjusting movement of both suspension units simultaneously and in a rake-frame lifting direction.

ROY W. JOHNSON.

References Cited in the file of this patent
UNITED STATES PATENTS

| Number | Name | Date |
| --- | --- | --- |
| 818,899 | Martin | Apr. 24, 1906 |
| 1,283,474 | Dain | Nov. 5, 1918 |
| 2,336,117 | Moschel et al. | Dec. 7, 1943 |
| 2,469,605 | McKay | May 10, 1949 |
| 2,476,183 | Fergason | July 12, 1949 |
| 2,491,211 | Rietz | Dec. 13, 1949 |
| 2,497,717 | Bowman | Feb. 14, 1950 |
| 2,518,389 | Sisulak | Aug. 8, 1950 |
| 2,531,934 | Crose | Nov. 28, 1950 |
| 2,597,828 | Spurlin | May 20, 1952 |